June 1, 1943. H. SINCLAIR ET AL 2,320,757
POSITIVE SYNCHRONIZING COUPLING MECHANISM
FOR POWER TRANSMISSION
Filed July 31, 1940 8 Sheets-Sheet 1

Inventors
Harold Sinclair
Robert Cecil Clerk
by
Dean Fairbank & Hoisch
Attys

June 1, 1943.  H. SINCLAIR ET AL  2,320,757
POSITIVE SYNCHRONIZING COUPLING MECHANISM
FOR POWER TRANSMISSION
Filed July 31, 1940  8 Sheets-Sheet 4

Inventors
Harold Sinclair
Robert Cecil Clark
by
Dean Fairbank & Hirsch
attys

Patented June 1, 1943

2,320,757

UNITED STATES PATENT OFFICE 2,320,757

POSITIVE SYNCHRONIZING COUPLING MECHANISM FOR POWER TRANSMISSION

Harold Sinclair, London, and Robert Cecil Clerk, Egham, England, assignors to Hydraulic Couplings Patents Limited, London, England, a company of Great Britain Application July 31, 1940, Serial No. 348,706
In Great Britain August 19, 1939

20 Claims. (Cl. 74—337)

This invention relates to coupling mechanism of the self-shifting kind, namely of the kind capable of engagement in response to torque acting in one sense through the mechanism and of disengagement in response to the application of torque in the opposite sense.

The invention is concerned with positive synchronizing coupling mechanisms of this kind including a first member, which may be for example the driving member or the driven member of the mechanism, a second member which may be the driven member or the driving member of the mechanism, and which is rotatable relatively to the first member, an intermediate member in driving connection with the second member and capable of sliding relatively to the first and second members into and out of meshing engagement with the first member, and a subsidiary ratchet drive between the first and intermediate members operative while these members are disengaged to synchronize them for meshing cleanly (i. e. with exact registering of the intermeshing teeth) together when the first and second members are urged to rotate relatively to each other in one sense, the auxiliary ratchet drive preferably being rendered inoperative by complete engagement of the first and intermediate members.

In such mechanism at present in use, examples of which are described in the specification of United Kingdom Patent No. 486,589, the second member is a shaft provided with helical splines and the intermediate member is a sleeve having corresponding internal helical splines co-operating with the splines on the shaft. When torque acts between the sleeve and the shaft, the splines co-operate to shift the sleeve along the shaft and thereby cause clutch teeth on the exterior of the sleeve to engage with or disengage from clutch teeth on the first member.

The internal helical splines in the sleeve are machined by a broaching operation, and while this is convenient for mass production of large quantities, the machining cost is unduly high in the production of relatively small batches.

Accordingly one object of this invention is to provide an alternative form of such positive synchronizing coupling mechanism which can be more cheaply machined in small batches.

When the synchronizing coupling mechanism is used as a gear-seelcting clutch in change-speed or reversing gearing, the known kind of intermediate member referred to also occupies a substantial length of shaft, and a further object of this invention is to provide an alternative construction of reduced axial dimensions.

Another object is to provide in such positive synchronizing coupling mechanism improved means operable for rendering the mechanism bidirectionally free and improved means operable for locking the mechanism in a condition in which it is adapted to transmit torques in both senses.

A further object is to provide in positive synchronizing coupling mechanism of the kind hereinbefore referred to, a second member in the form of a slidable helical toothed gear wheel. In this form the improved mechanism is particularly adapted for use as gear-selecting mechanism in change-speed and reversing gearing, since the helical gear wheels may be constituted by parts of the gearing that would be essential, irrespective of the kind of gear-selecting clutch mechanism employed, and the length of the gearing is accordingly relatively short. With this form of the improved arrangement, under certain circumstances frictional effects may prevent the desired sliding of the intermediate member unless suitable precautions are taken, and it is another object to provide such a construction in which frictional effects do not interfere with the desired sliding.

Another object is to provide positive synchronizing coupling mechanism having internal and external jaw-clutch teeth of a form capable of being machined on conventional helical gear cutting machines.

Further objects and advantages of the invention will be apparent from the following description of examples thereof shown in the accompanying drawings, in which.

Figure 6:
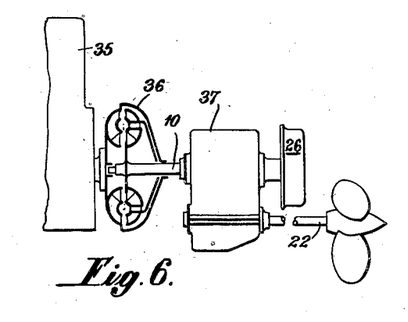
Fig. 6 is a diagram of a marine propelling plant embodying the gearing shown in Figs. 1 to 5, Figs. 7 to 12 show the same gearing in different configurations.

The gearing shown in Figs. 1 to 12 comprises an input shaft 10 coupled to the marine engine 35 by a hydraulic coupling 36 of the kinetic type (Fig. 6). The shaft 10 is provided with a flange 11 (Figs. 3 and 4) on the periphery of which are cut outwardly projecting jaw-clutch teeth 12, which are of double-helical type having a helix angle of 15 deg. The front halves of these teeth (that is the halves nearer the engine) follow a right-handed helix. On the shaft 10 in front of the flange 11 is journalled and slidable a forward driving gear wheel 13 having left-handed helical teeth with a helix angle of 30 degrees. Integral with this gear wheel is a rearwardly directed tubular projection 14 having internal right-handed 15 deg. helical teeth 15 adapted to mesh with the front halves of the jaw-clutch teeth 12. On the front of the flange 11 are pivoted one or more pawls such as 16 (Figs. 3 and 4) the noses of which point in the anti-clockwise direction (as viewed from the front) and are bevelled to co-operate with the jaw-clutch teeth 15 when the wheel 13 is in such a position axially of the shaft 10 that the jaw-clutch teeth 15 are spaced slightly from the teeth 12. The pawls 16 are pivoted on pins 16A fast in the flange 11, and their noses are urged outwards by hair-pin springs 16B located by pins 16C also fast in the flange 11. These springs are omitted from Fig. 4.

Figure 1:
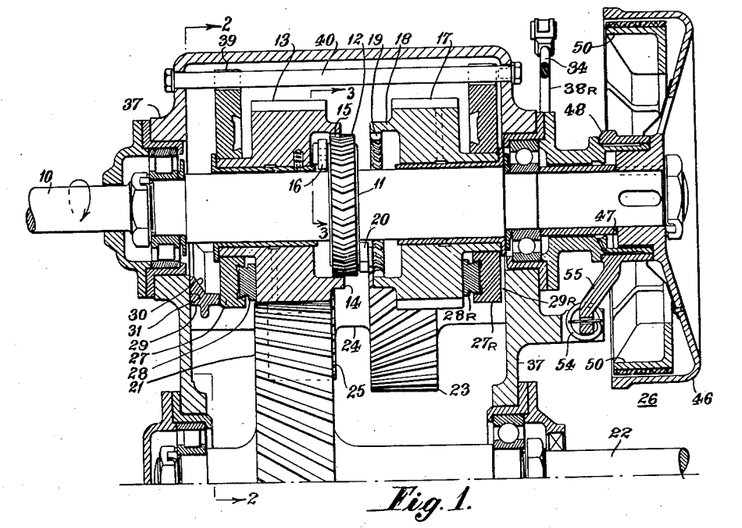
Fig. 1 is a sectional side elevation of a marine reversing gearing, taken on the line 1—1 in Fig. 2.

On the shaft 10 behind the flange 11 is journalled and slidable a reverse driving gear wheel 17 having right-handed 30-deg. helical teeth and a forwardly-directed tubular projection 18 having internal left-handed 15-deg. helical teeth 19 adapted to mesh with the rear halves of the jaw-clutch teeth 12 under the control of one or more pawls such as 20 pivoted on the back of the flange 11 and having their noses also pointing in the anti-clockwise direction (as viewed from the front) and bevelled to co-operate with the jaw-clutch teeth 19.

Figure 2:
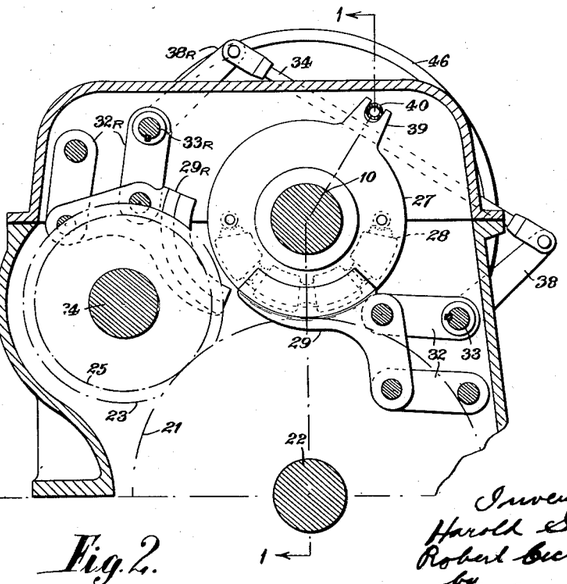
Fig. 2 is a sectional end elevation on the line 2—2 in Fig. 1.

The forward gear wheel 13 is in constant mesh with a driven gear wheel 21 fast on an output shaft 22 which is directly coupled to or which forms the propeller shaft, and the reverse gear wheel 17 is in constant mesh with an intermediate wheel 23 which may be fast on a lay shaft 24 to which is also fixed a second intermediate wheel 25 in constant mesh with the driven gear wheel 21.

The control mechanism includes means, such as a back-turning brake of known kind, as described in the specification of Patent No. 1,978,172), operable for temporarily imparting a backward rotation to the input shaft 10, i. e. anti-clockwise as viewed from the front. This brake as a whole is denoted by 26. There is also provided an axially controllable thrust bearing capable of operating between the front face of the forward driving gear wheel 13 and an abutment face 31 on the casing 37 of the gearing for retaining, when required, this gear wheel in its rearmost position in which the forward jaw-clutch teeth 15 are engaged with the teeth 12. This thrust bearing may consist of a ring 27 provided with standard type Michell thrust pads 28 bearing against the front face of the forward gear wheel 13. This ring is provided with a fork 39 which is engaged on a rod 40 fixed in the casing, so that the ring 17 is prevented from rotating. An arcuate wedging and abutment member 29, the rear face of which may be bevelled at 30 in the form of a part of a shallow conical frustum, is displaceable radially of the driving shaft 10 and adapted to be inserted between the thrust ring 27 and the gear casing, preferably in the neighbourhood of the line of engagement of the pair of gears 13, 21 of the forward train. A similar but oppositely directed thrust, wedging and abutment assembly 27R, 29R is disposed behind the reverse driving wheel 17, the two wedging and abutment members 29 and 29R being movable radially of the driving shaft in opposite senses by a common control lever. The wedging member 29 is carried by parallel links 32 one of which is fixed to a shaft 33 journalled in the casing 37. The wedging member 29R is carried by parallel links 32R, one of which is fixed to a shaft 33R journalled in the casing. The shafts 33 and 33R are constrained to rotate in unison by a matically in Fig. 5 and includes a lever 40 fixed link 34 and arms 38 and 38R.

Figures 3, 4, 5:
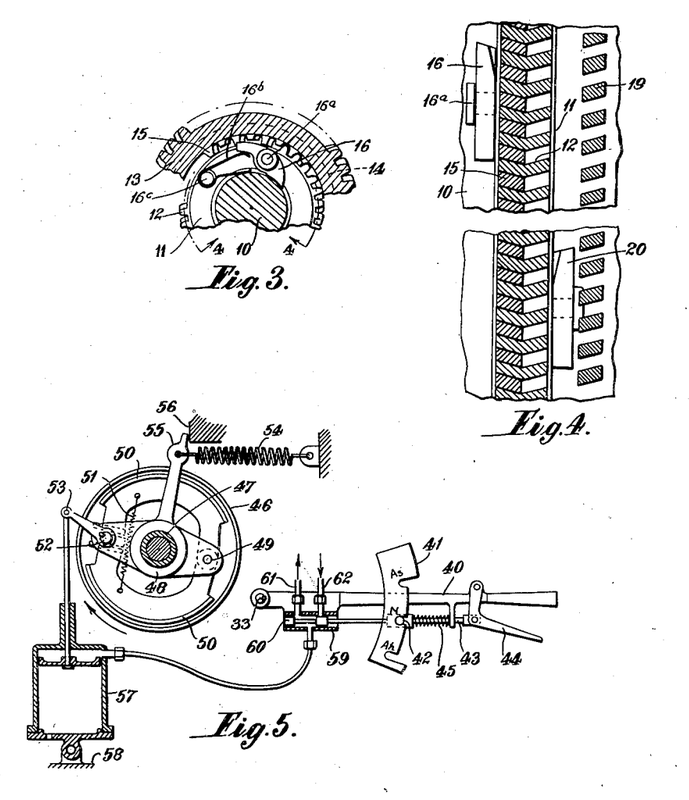
Fig. 3 is a sectional view of a detail of this gearing taken on the line 3—3 in Fig. 1.
Fig. 4 is a developed view of a detail taken on the line 4—4 in Fig. 3.
Fig. 5 is a diagram of control mechanism.

The control mechanism is shown diagrammatically to the shaft 33 and movable in a fixed quadrant 41. The lever 40 is provided with a latch pin 42 projecting from a rod 43 which can be displaced against a return spring 45 by a grip lever 44. The latch pin can engage in three notches in the quadrant 41, these notches being denoted respectively by A*h* (ahead), N (neutral), and A*s* (astern).

The back-turning brake 26 includes a drum 46 keyed to the shaft 10. A tubular boss 47 is fixed to the casing 37 (Fig. 1) and on it is journalled a rocking bracket 48 on which are pivoted at 49 two brake shoes 50, which are normally contracted by a spring 51. The shoes can be expanded into contact with the drum 46 by a camshaft 52 actuated by a lever 53. The bracket 48 is normally retained in the position shown in Fig. 5 by a relatively strong spring 54 which retains an arm 55, integral with the bracket 48, against a fixed stop 56.

A contracting link formed by a fluid pressure motor 57 is connected between the lever 53 and a fixed pivot 58. The motor 57 is controlled by a valve 59 having a piston 60 connected to the rod 43 of the latch mechanism of the control lever 40. When this lever is latched in any of the three notches in the quadrant 41, the cylinder of the motor 57 is in communication with an exhaust pipe 61. When the lever 40 is unlatched, the motor cylinder is in communication with a fluid pressure supply pipe 62.

Figure 7:
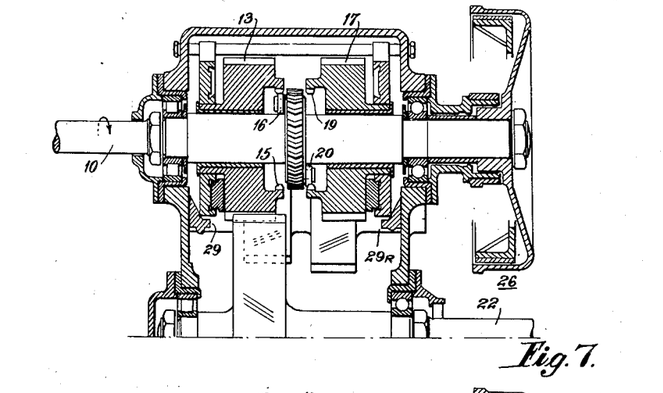
Figure 8:
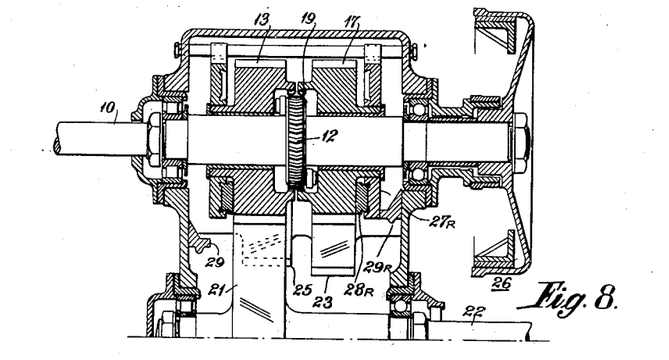
Figure 9:
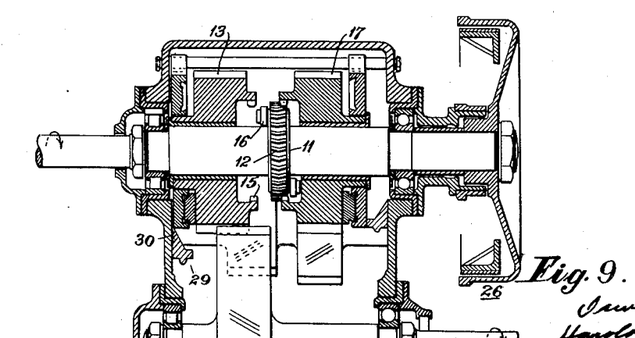

When the control lever 40 is in the neutral position as shown in Fig. 5 and the engine is running, the brake 26 and both jaw clutches are disengaged, and the driving gear wheels 13 and 17 are restrained axially by the members 29 and 29R in such a position that both sets of pawls 16 and 20 ratchet idly over the jaw-clutch teeth 15 and 19. This condition is shown in Fig. 7. (In Figs. 7 to 12 the member 29R, which is actually at the side of the shaft 10, is shown beneath this shaft, so as to make the sequence of operations clearly understandable.)

In order to put the gear into the "astern" condition the latch grip lever 44 is now actuated to raise the latch pin 42 from the notch N. Pressure fluid is consequently admitted to the link 57 which begins to contract, moving the cam-shaft 52 counter-clockwise (as viewed in Fig. 5) and engaging the shoes 50 with the drum 46, which is rotating in the direction shown by the arrow in Fig. 5, so that the shaft 10 is arrested, the hydraulic coupling 36 permitting the engine to continue idling. While the shaft 10 is being arrested, the spring 54 holds the bracket 48 in the position shown in Fig. 5, with the lever 55 against the stop 56. As soon as the shaft 10 has come to rest, the link 57 is able to contract further, so that the lever 53, the bracket 48, the brake shoes 50, the brake drum 46 and the shaft 10 are caused to rock backwards as a whole; consequently pawls of both sets 16 and 20 engage jaw clutch teeth 15 and 19, and the torque thereby applied to the gear wheels 13 and 17 causes them to slide towards each other, as a result of the reaction of their helical teeth, assisted by the reaction of the pawls on the helical jaw clutch teeth, until both jaw clutches are fully engaged and the gearing consequently resists further backward rotation. The control lever 40 is now moved to the "astern" position and causes the reverse wedging and abutment member 29R to assume its fully operative position behind the reverse thrust ring 27R (Fig. 8) and the forward wedging and abutment member 29 to assume its completely inoperative position. When the latch pin 42 drops into the notch As, the contracting link 57 is de-energized and the springs 51 and 54 restore the brake 26 to the disengaged condition shown in Fig. 5. The shaft 10 then begins to rotate forwards (as indicated by the arrow thereon in Fig. 1) and the engine is accelerated. Since the reverse driving wheel 17 is prevented by the thrust pads 28R from sliding rearwards on the input shaft 10 under the reactions of its helical teeth and of the co-operating jaw-clutch teeth 12 and 19, the reverse jaw clutch 12, 19 remains locked in engagement and the reverse gear train 17, 23, 25, 21 drives the output shaft 22. The operation of the forward gear train 13, 21 has meanwhile caused the forward driving wheel 13 to slide to the front as a result of the reactions of the helical teeth of the gear wheels and of the jaw clutch teeth 12 and 15 until the forward jaw clutch 12, 15 has disengaged (Fig. 9), the light friction of this wheel on its bearing being sufficient to cause it to assume its foremost position so that the pawls 16 of the forward jaw clutch also are inoperative. Forward drive is engaged from neutral in a similar manner.

Figure 10:
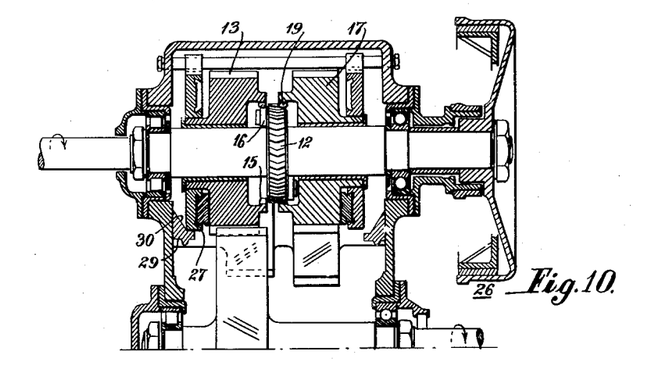
Figure 11:
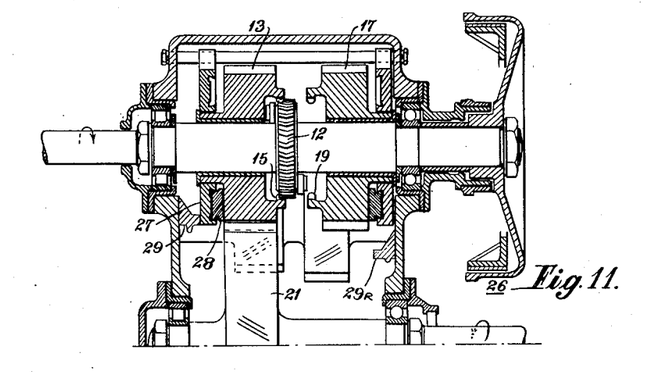

When it is desired to change from astern to ahead the engine is retarded, and the control lever 40 is unlatched and immediately moved towards the ahead position until the bevelled surface 30 on the wedging and abutment member 29 associated with the previously idle forward gear train slides the driving pinion 13 of that train far enough towards the flange 11 to bring the jaw-clutch teeth 15 into co-operation with the pawls 16 (Fig. 10). Unlatching of the lever 42 has caused the back-turning brake 26 to be applied, with the result that the gearing and shafts are arrested and thereafter caused to rock in the opposite direction. Since the brake takes an appreciable time to bring the gearing and shafts to rest, the member 29 will have displaced the pinion 13 far enough to bring the teeth 15 into the path of the pawls 16 before the gearing and shafts are rocked in the opposite direction. This back-turning effect, owing to the reaction of the helical gear-wheel and jaw-clutch teeth, maintains the reverse clutch 12, 19 engaged and causes the forward clutch 12, 15 to be drawn into full engagement, the reaction of the pawl 16 and the tooth 15 with which it is engaged assisting the sliding movement of the parts, whereupon the gearing resists further backward rocking. The forward wedging and abutment member 29 is now free to engage fully in front of the thrust ring 27, as shown in Fig. 11, while the reverse wedging and abutment member 29R assumes its inoperative position as the lever 40 is moved to engage the latch pin 42 in the notch Ah. As this lever latches home, the back-turning brake 26 disengages and the engine is accelerated. Since the forward driving wheel 14 is prevented by the thrust pads 28 from sliding forward on the input shaft 10 under the reactions of its helical teeth and of the helical clutch teeth 12 and 15, the forward jaw clutch 12, 15 remains locked in engagement and the forward gear train 13, 21 drives the output shaft 22. The operation of the reverse gear train has meanwhile caused the reverse driving wheel 17 to slide to the rear as a result of the reaction of the helical gear-wheel and jaw clutch teeth until the reverse jaw clutch 12, 19 has disengaged (Fig. 11).

Figure 12:
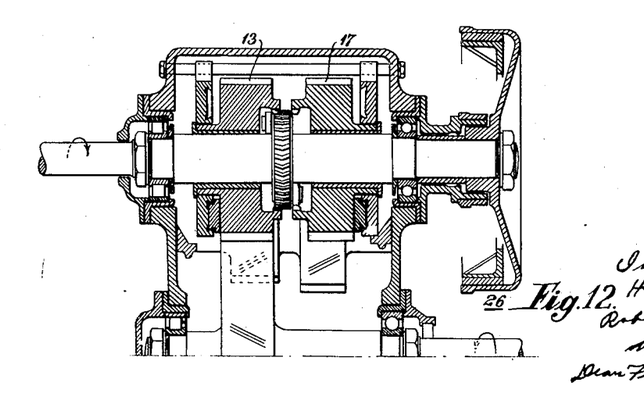

The change from forward to reverse is made in a corresponding manner, the conditions while the parts are being retarded by the brake 26 being shown in Fig. 12.

Figure 13:
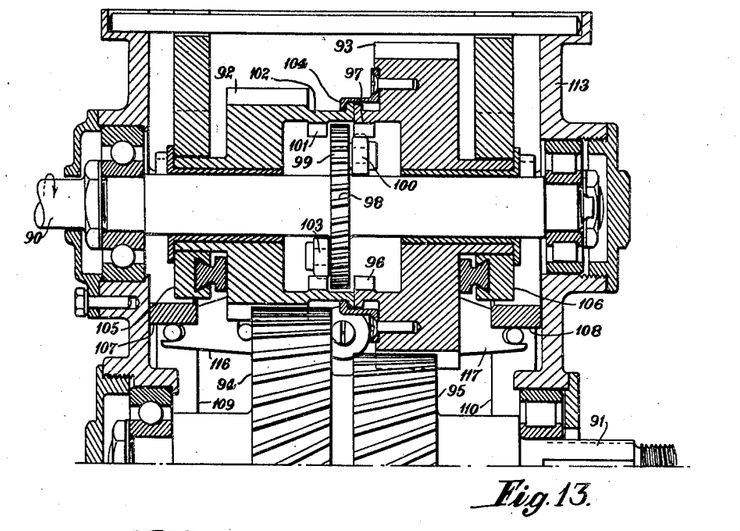
Fig. 13 is a diagrammatic section of a two-speed synchronizing self-shifting gear arranged to give a bidirectional drive on each speed.

The gearing shown in Fig. 13 has parallel input and output shafts 90 and 91, and the two axially slidable right-handed 30-deg. helical gear wheels 92 and 93 for giving the alternative ratios are journalled on the input shaft 90 and are in constant mesh respectively with left-handed helical gear wheels 94 and 95 fast on the output shaft. Jaw-clutch teeth 96 on the interior of a tubular extension 97 of the wheel 93 are adapted to mesh with clutch teeth 98 on a flange 99 on the shaft 90 under the control of pawls 100 pivoted on the flange 99 and directed anti-clockwise as viewed from the left-hand side. The wheel 92 has jaw-clutch teeth 101 on the interior of a tubular extension 102 adapted to mesh with the teeth 98 under the control of pawls 103 which are directed clockwise. The jaw-clutch teeth 96, 98 and 101, and the noses of the pawls 100 and 103 are arranged on 15-deg. left-handed helixes. The ends of the tubular extensions 97 and 102 are maintained adjacent to one another by a flanged shroud 104 which is fixed to the wheel 93 and which serves, with these extensions, as a ganging connection between the wheels 92 and 93. The wheels 92 and 93 are provided with thrust rings 105 and 106 arranged similarly to those shown in Fig. 1. Control means include two displaceable abutment members 107 and 108 which are respectively rigid with vertically slidable bars 109 and 110 (Fig. 14) provided with slots 111 accommodating guide pins 112 screwed into the gear casing 113. The bars 109 and 110 are provided with pins 114 and 115 with which are engaged levers 116 and 117. The latter lever is journalled on a control shaft 118 which in turn is journalled in a boss 119 in the casing 113 and the lever 116 is journalled on the boss of the lever 117. A plate 120 rigid with the shaft 118 carries pins 121 and 122 engaged respectively in arcuate slots 123 and 124 in the levers 116 and 117, and springs 125 and 126 urge these levers upwards so that the pins will lie in the lower ends of the slots. A crank 127 fixed to the shaft 118 is connected to a control handle not shown.

Low gear is established as follows. It will be assumed that the parts are in the configuration shown in Fig. 13 and are stationary. The control shaft 118 is rocked clockwise as seen in Fig. 14 so that the spring 125 urges the lever 116 upwards and causes the abutment member 107 to press upwards against the periphery of the thrust ring 105.

Figures 14, 15:
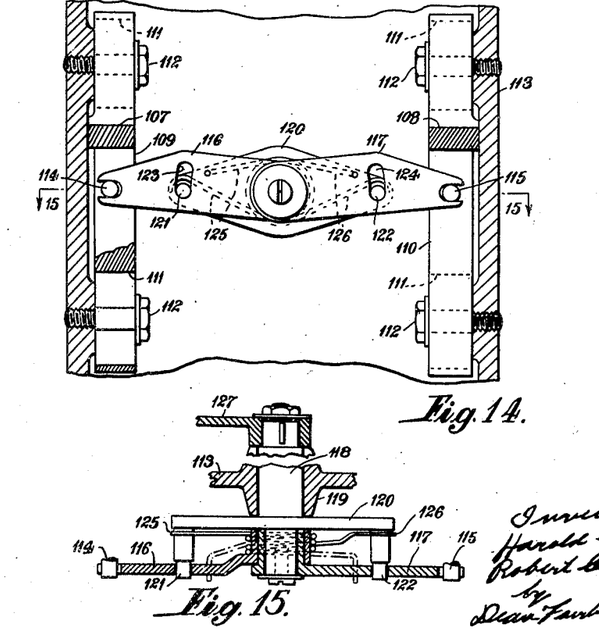
Fig. 14 is a sectional elevation of the control mechanism of the gear shown in Fig. 13 taken on a plane parallel to and behind that of Fig. 13.
Fig. 15 is a sectional plan on the line 15—15 in Fig. 14.

The shaft 90 is now set in rotation in the direction indicated by the arrow in Fig. 14, and a pawl 103 engages a tooth 101 and thus causes the teeth 98 and 101 to mesh together in consequence of the reactions of the helical gear wheel and jaw-clutch teeth. The wheel 92 now abuts against the pivot pins of the pawls 103. Thereupon the spring 125 operates to raise the abutment member 107 into position behind the thrust ring 105. While low gear is engaged the pawls 100 do not click over the teeth 96.

To change to high gear the control shaft 118 is urged in the anti-clockwise direction so that it returns to the position shown in Fig. 14, withdrawing the abutment member 107 to its inoperative position, and thereafter moving further to cause the abutment member 108 to press upwards against the periphery of the thrust ring 106. The driving shaft 90 is now retarded, and the inertia of the load causes the wheel 92 to overrun the shaft 90, so that this wheel moves to the left in consequence of the reaction of its helical teeth assisted by the reaction of the helical clutch teeth 98 and 101, the wheel 90 drawing with it the wheel 93 through the agency of the ganging connection 104 until the clutch teeth 96 come into the path of the pawls 100; when the speed of the shaft 90 tends to drop below that of the wheel 93, a pawl 100 engages a tooth 96 and moves the wheels 93 and 92 to the left, under the influence of the reaction of the helical teeth of the wheel 93 assisted by the reaction of the pawl 100 on the helical tooth 96, until the teeth 96 and 98 are fully engaged, the wheel 93 abutting against the pivot pins of the pawls 100. Thereupon the spring 126 operates to raise the abutment member 108 into place behind the thrust ring 106, so as to prevent disengagement of the jaw-clutch teeth 96 and 98 when driving torque is re-applied and so lock the gearing in high gear.

In order to change from high to low gear the control shaft 118 is urged in the clockwise direction and the input torque is momentarily interrupted, for example by actuating a control member of the engine. As the torque and with it the axial thrust on the wheel 93 fall, the abutment member 108 is freed and withdrawn to its inoperative position while the abutment member 107 is pressed upwards. As the engine accelerates, the wheel 93 slides to the right under the reaction of its helical teeth, assisted by the reaction of the helical clutch teeth 98 and 96, taking with it the wheel 92 until the teeth 96 disengage from the teeth 98 and the pawls 100 ratchet over the teeth 96. At first the pawls 103 will ratchet over the teeth 101, but, as the speed of the shaft 90 tends to exceed that of the wheel 92, a pawl 103 engages a tooth 101 and low gear is established as previously described.

The gear shown in Figs. 16 to 20 yields four speeds in both directions of rotation of the ultimate driven shaft, the changes to higher speeds being effected without complete interruption of torque, in accordance with Patent No. 2,011,734.

A primary shaft 130 is connected to an internal-combustion driving engine 35A (Fig. 19) by a hydraulic coupling 36A. This shaft rotates in the direction of the arrow shown in Fig. 16 and is journalled in a gear case 131 by a deep-groove ball bearing 132 and a roller bearing 133. A secondary shaft 134 is journalled in the gear case by a thrust bearing 135 and three roller bearings 136. A bevel pinion shaft 137 is disposed parallel to the shafts 130 and 134 and is integral with a pinion 138 meshing with a bevel wheel 139 fixed to a transverse shaft 140 which is connected by reduction gearing, not shown, to the driving axles of the locomotive. Fig. 20 shows clearly the relationship of the several gear shafts.

A first-speed driving wheel P1 having twenty-one helical teeth with a 30-deg. left-handed helix angle is fixed to the primary shaft 130 and is in constant mesh with a forty-seven tooth wheel S1, which accordingly has right-handed helical teeth. The wheel S1 is slidable and rotatable on the secondary shaft 134. The wheel P1 is integral with a tubular extension 144 provided with internal clutch teeth 145 having a left-handed helix angle of 15 degrees. The hub of the wheel S1 has a flange 146 provided with left-handed 15-deg. helical clutch teeth 147, and pawls 148 having left-handed 15-deg. helical noses are pivotally mounted on the rear of this flange. (The right-hand end of the gear case, as viewed in Fig. 16, will be regarded as the "front" and the left-hand end as the "rear.") The noses of these pawls point in the direction of rotation indicated by the arrow.

Figure 16:
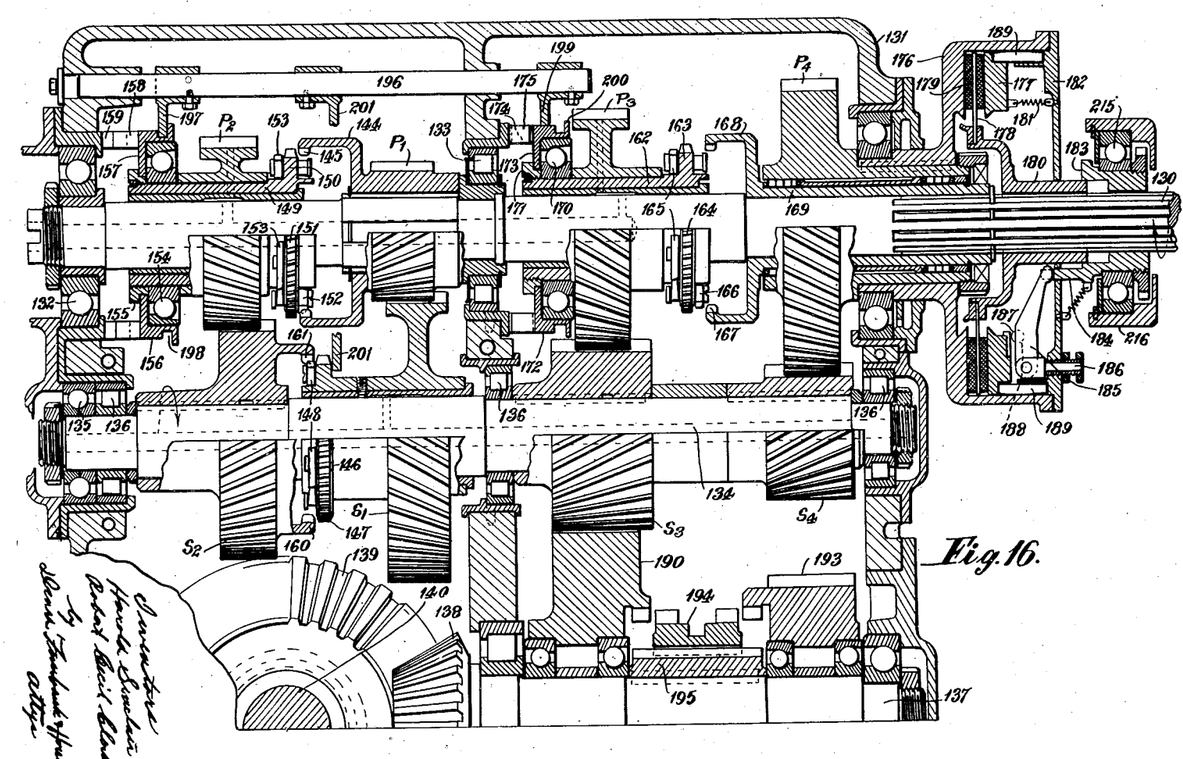
Fig. 16 is a sectional elevation, taken on the line 16—16 in Fig. 20, of a four-speed gear suitable for locomotives.
Figure 17:
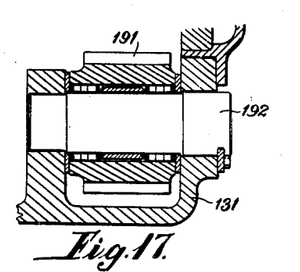
Fig. 17 is a section of a detail of the gear shown in Fig. 16.

A second-speed driving wheel P2 having thirty right-handed 30-deg. helical teeth is rigid with a sleeve 149 slidable and rotatable on the shaft 130 and is in constant mesh with a wheel S2 which has thirty-eight left-handed helical teeth and is fixed to the shaft 134. The sleeve 149 has a flange 150 provided with left-handed 15-deg. helical jaw-clutch teeth 151 adapted to mesh cleanly with the teeth 145 under the control of pawls 152 and 153 which have corresponding helical noses. The pawls 152 on the front of the flange have their noses pointing in the normal direction of rotation, while the noses of the pawls 153 on the rear of this flange trail with respect to this direction of rotation. A one-way thrust bearing 154 has an inner race clamped to the sleeve 149 by a nut 155 and an outer race mounted in an abutment ring 156 having an inwardly directed flange 157 located by the nut 155. Uniformly pitched axially projecting teeth 158 on the rear of the abutment ring 156 co-operate with axially projecting teeth 159 formed on the fixed housing of the bearing 132.

The wheel S2 has a forwardly projecting tubular extension 160 having internal left-handed 15-deg. helical clutch teeth 161 adapted to mesh cleanly with the teeth 147 under control of the pawls 148.

A third-speed driving wheel P3 having thirty-eight right-handed 30-deg. helical teeth is rigid with a sleeve 162 slidable and rotatable on the shaft 130 and is in constant mesh with a wheel S3 which has thirty left-handed helical teeth and is fixed to the shaft 134. The sleeve 162 has a flange 163 provided with left-handed 15-deg. helical jaw-clutch teeth 164 adapted to mesh cleanly, under the control of pawls 165 and 166, which have corresponding helical noses, with left-handed 15-deg. helical jaw-clutch teeth 167 within a tubular extension 168 of a sleeve 169 rigid with the shaft 130. The pawls 166 on the front of the flange 163 have their noses pointing in the normal direction of rotation, while the noses of the pawls 165 on the rear of this flange trail with respect to this direction of rotation. A one-way thrust bearing 170 has an inner race clamped to the sleeve 162 by a nut 171 and an outer race mounted in an abutment ring 172 having an inwardly directed flange 173 located by the nut 171. Uniformly pitched axially projecting teeth 174 on the rear of the abutment ring 172 co-operate with axially projecting teeth 175 formed on the fixed housing of the bearing 133.

A fourth-speed driving wheel P4 having forty-seven teeth, which may be 30-deg. right-handed helical, is in constant mesh with a twenty-one tooth wheel S4 fixed to the shaft 134, is journalled on the sleeve 169 and is rigid with the driven body 176 of a friction clutch having a driving plate 178 which can be clamped against a facing 179 on the body by a presser plate 177. The driving plate 178 is fixed to a hub 180 which is splined to the shaft 130. This friction clutch is normally held in the disengaged condition shown by means of tension springs such as 181 connected between the front of the plate 177 and a cover 182 fixed to the body 176. Means for engaging the clutch include a slidable striking ring 183 having axial fingers such as 184 which project through apertures in the cover 182 and engage the inner ends of radial levers such as 185 the outer ends of which are pivotally connected to studs 186 secured to the cover 182 and which are adapted to bear, through the intermediary of balls 187 partly sunk in pockets 188 in the levers, on the presser plate 177. This clutch also includes oblique rockable struts 189 fitted between the presser plate 177 and the cover 182 and capable of assisting the engaging force in response to the application of driving torque, in the manner described in U. K. patent specification No. 508,088.

The gear wheel S3 is in constant mesh with a forward driving wheel 190 journalled on the shaft 137 and the gear wheel S4 is in constant mesh with a reverse idler wheel 191 (Fig. 17) journalled on a fixed pin 192 and meshing with a reverse driving wheel 193 also journalled on the shaft 137. The wheels 190 and 193 can be alternatively clutched to the shaft 137 by a jaw-clutch element 194 slidably splined to a collar 195 rigid with the shaft 137. This reversing jaw clutch element is actuated by any suitable shifting mechanism not shown.

A ganging bar 196 is so mounted in the gear case 131 as to be slidable parallel to the gear shafts. A striking fork 197 fixed to the bar 196 fits closely in a groove 198 in the abutment ring 156, and a striking fork 199 also fixed to the bar 196 is disposed behind and adapted to co-operate with a flange 200 on the abutment ring 172. An arm 201 fixed to the bar 196 is disposed with its end in front of the flange 146 of the hub of the wheel S1.

Figure 18:
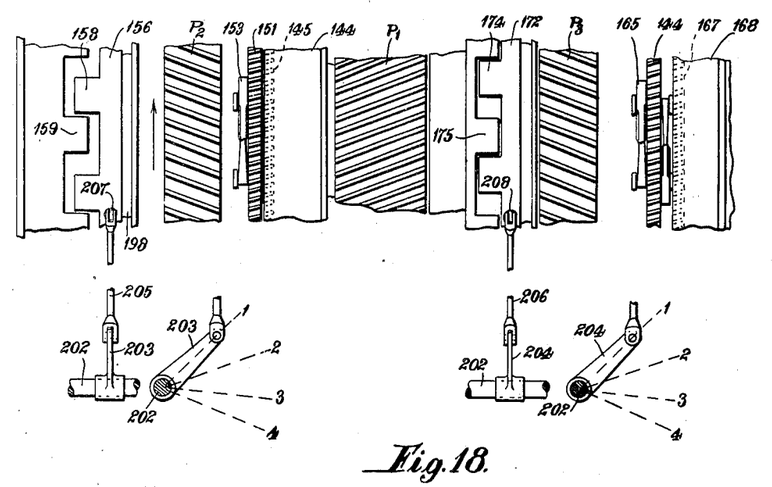
Fig. 18 is a developed view of parts of the gear shown in Fig. 16.
Figure 19:
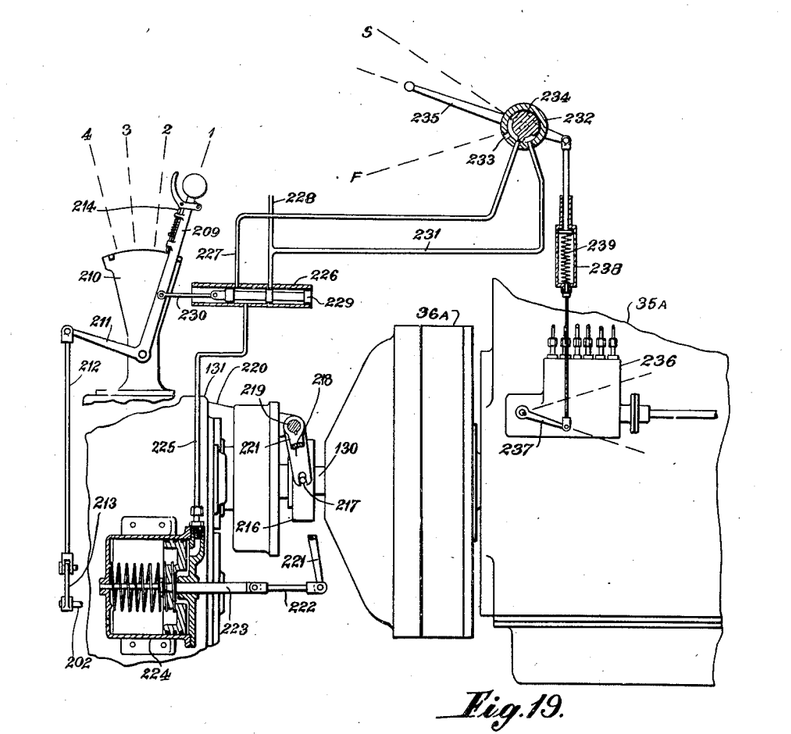
Fig. 19 is a side elevation of part of a power-transmission system embodying the gear shown in Fig. 16, showing control mechanism partly in section.
Figure 20:
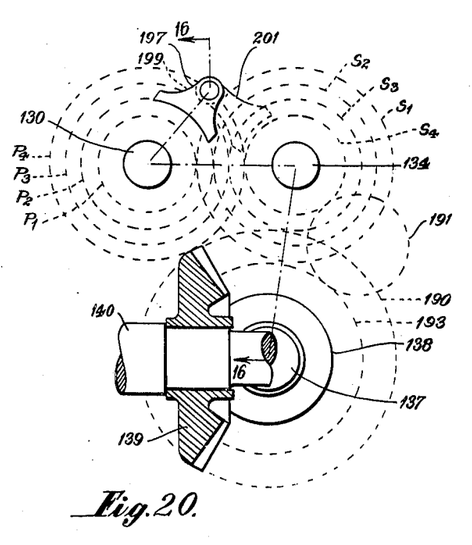
Fig. 20 is a diagrammatic end elevation of the gear as viewed from the left of Fig. 16.

The control mechanism is shown in the developed view in Fig. 18 and in Fig. 19. A gear-selecting control shaft 202 is journalled in the gear case 131 and to it are fixed levers 203 and 204 (Fig. 18) which are connected respectively by links 205 and 206 to lugs 207 and 208 on the rings 156 and 172, whereby these rings can be displaced about the axis of the shaft 130. A gear-selecting control lever 209 (Fig. 19) operates in a fixed quadrant 210 and is rigid with an arm 211 which is connected by a link 212 with a lever 213 fixed to the gear-selecting control shaft 202. The control lever is provided with a latch 214 adapted to lock it in each of the four positions denoted by 1, 2, 3, and 4 and representing respectively first, second, third and fourth speeds. The positions of the levers 203 and 204 are similarly denoted in Fig. 18. These parts are shown in the first-speed position. The teeth 174 on the abutment ring 172 are narrower than the gaps between the fixed teeth 175 with which they co-operate, with the result that the teeth 174 are in register with these gaps when the control mechanism is in second-speed position also, under which condition the abutment ring 156 will have shifted to the front, in a manner to be described hereinafter, and the ends of the teeth 158 on that ring will overlap the ends of the teeth 159. When the control mechanism is in third-speed and fourth-speed positions, both abutment rings 156 and 172 will have been shifted to the front, and the ends of the teeth 158 and 174 will respectively overlap the ends of the teeth 159 and 175.

The striking ring 183 of the friction clutch is connected through a thrust bearing 215 (Fig. 16) to a non-rotatable ring 216 which is connected by opposed radial pins such as 217 (Fig. 19) to a yoke 218 fast on a transverse shaft 219 carried by brackets such as 220. A lever 221 fixed to the shaft 219 is connected by a link 222 to the piston rod 223 of a pneumatic servo-motor 224 the cylinder of which is fixed to the gear case 131, the arrangement being such that, when compressed air is supplied to the motor through a pipe 225, the piston is thereby forced rearwards, engaging the friction clutch. The pipe 225 connects to a piston valve body 226 to which are also connected a pipe 227 connecting with a rotary valve body 232 and a pipe 228 connected to a compressed air reservoir (not shown). The piston 229 of this valve is connected by a link 230 with the gear control lever 209, the arrangement being such that, when the lever 209 is in first, second and third-speed positions, the pipes 225 and 227 communicate with each other and the pipe 228 is sealed, and when the lever 209 is in the fourth-speed position, the pipes 225 and 228 communicate with each other and the pipe 227 is sealed.

The pipe 227 and a branch 231 from the supply pipe connect with the valve body 232 having a port 233 open to atmosphere. The body 232 contains an oscillatory plug 234 rigid with a lever 235 controlling the power output of the engine 35A, which is of the compression-ignition type and includes a battery 236 of fuel-injection pumps the delivery of which is variable by actuation of a lever 237 shown in the idling position. The lever 235 is connected to the lever 237 by a spring link 238 which is normally kept expanded as shown by a compression spring 239. The control lever 235 is movable between a position F, corresponding to full power, through the idling position shown, to a position S such that the lever 237, which cannot pass beyond the idling position, causes the spring link 238 to contract. When the lever 235 is in the idling and the full-power positions and anywhere between these positions, the rotary valve maintains the pipe 227 in communication with the port 233 and seals the pipe 231. When the lever 235 is moved to position S, the rotary valve puts the pipes 227 and 231 into communication with each other and isolates the port 233.

This mechanism operates as follows. It will be assumed that the control levers are in the positions shown in Fig. 19, that the engine is idling, that the reversing jaw-clutch element 194 is engaged with say the wheel 198, and that the locomotive is stationary. The hydraulic coupling urges the shaft 130 and the wheel P1 to rotate. Since the wheel S1 is prevented by the arm 201, in a manner which will be hereinafter explained, from moving in front of the position in which it appears in Fig. 16, this wheel is prevented from rotating by engagement of a pawl 148 with a tooth 161. The reaction of the helical teeth of the wheels P1 and S1, assisted by the reaction of the pawl 148 and the helical jaw-clutch tooth 161 with which it is engaged, causes the wheel S1 to slide rearwards so that the teeth 147 mesh cleanly with the teeth 161. The lever 235 (Fig. 19) is now displaced towards position F, the engine accelerates, and the locomotive starts, the power being transmitted through shaft 130, wheels P1 and S1, jaw clutch 147, 161, wheel S2, shaft 134, wheels S3 and 198, clutch member 194 and shaft 137. When the gear is running thus in first speed, the shaft 130 rotates faster than the wheel P2; friction between this wheel and the shaft 130 thus causes a reaction between the meshing teeth of the wheels P2 and S2 which maintains the wheel P2 in its rearmost position, such that the pawls 152 are behind the teeth 145 and therefore do not click over them. Likewise the shaft 130 rotates faster than the wheel P3 so that the reaction of the meshing helical teeth of the wheels P3 and S3 carrying the load due to friction between the wheel P3 and the shaft 130 maintains the wheel P3 in the position shown in Fig. 16, such that pawls do not click over the teeth 167. Since the ganging bar 196 is constrained to shift with the wheel P2, it will assume its rearmost position.

In order to change to second speed, the engine control lever 235 is moved to position S with the result that the engine fuel supply is reduced and the servo-motor 224 is energized engaging the friction clutch which while slipping serves to retard the shaft 130 by coupling it to the slower rotating wheel P4 and also maintains the output of driving torque by expending the kinetic energy of the rotating elements in front of the gear box. At the same time the gear-selecting lever 209 is unlatched and urged towards position 2. As soon as the speed of the shaft 130 begins to fall relatively to that of the shaft 134, the torque reaction between the helical teeth of the wheels P1 and S1, assisted by the reaction between the helical jaw-clutch teeth 147 and 161, causes the wheel S1 to slide to the front, disengaging these clutch teeth. Such sliding of the wheel S1 causes the flange 146 to slide the ganging bar 196 to the front through the agency of the arm 201, so that the wheel P2 is slid to the front by the fork 197 until the pawls 152 come into the path of and ratchet over the jaw-clutch teeth 145. When the speed of the shaft 130 begins to drop below that of the wheel P2, a pawl 152 engages a tooth 145, and the reaction between the helical teeth of the wheels P2 and S2, assisted by the reaction between the engaged pawl 152 and helical tooth 145, causes the wheel P2 to slide to the front, the jaw-clutch teeth 145 and 151 meshing cleanly together under the control of the pawl 152. Sliding of the wheel P2 continues until the pawls 153 come into the path of and ratchet over the teeth 145. At the same time the fork 199 on the ganging bar 196 has shifted the wheel P3 to the right until the pawls 166 come in the path of and ratchet over the faster rotating jaw-clutch teeth 167 and develop a drag which causes sufficient reaction between the wheels P3 and S3 to prevent the wheel P3 from sliding further to the front. As soon as the wheel P2 has slid so far to the front that the teeth 158 on the abutment ring 156 come out of mesh with the fixed teeth 159, the gear-selecting mechanism becomes free to move, and the driver latches the lever 209 in position 2 and returns the engine control lever 235 towards position F. In consequence the servo-motor 224 is de-energized, the friction clutch disengages, and the engine accelerates. When the shaft 130 tends to rotate faster than the wheel P2, a pawl 153 engages with a tooth 145, and the reaction thus introduced between the helical teeth of the wheels P2 and S2, assisted by the reaction between the pawl 153 and the tooth 145 with which it is engaged, causes the wheel P2 to slide to the rear, the jaw-clutch teeth 151 meshing cleanly with the teeth 145 under control of the pawl 153. As these teeth become fully engaged together, the ends of the teeth 158 on the abutment ring 156 abut the ends of the fixed teeth 159 so that the wheel P2 is prevented from sliding farther to the rear. Power is now transmitted from the shaft 130, through the parts P1 and 144, the jaw-clutch 145, 151, the wheels P2 and S2 and thence as on first speed. When second-speed driving conditions are established the wheels S1 and P3 slide, under the influence of the helical tooth reactions due to frictional drag, respectively to their foremost and rearmost positions, so that no pawls will click idly over jaw-clutch teeth.

In order to change from second to third speed, the engine control lever is moved to position S. The resulting slipping engagement of the friction clutch retards the shaft 130 by coupling it to the wheel P4 which still rotates slower than the shaft 130, and also maintains the output of driving torque. At the same time the gear-selecting lever 209 is unlatched and moved towards position 3. As soon as the speed of the shaft 130 begins to fall relatively to that of the shaft 134, the torque reaction between the helical teeth of the wheels P2 and S2, assisted by the reaction between the helical jaw-clutch teeth 145 and 151, causes the wheel P2 to slide to the front, disengaging these clutch teeth. Such sliding of the wheel P2 causes the ganging bar 196 to slide to the front, through the agency of the fork 197, so that the fork 199, abutting against the flange 200 on the abutment ring 172, causes the wheel P3 also to slide to the front until its pawls 166 come into the path of and ratchet over the jaw-clutch teeth 167. When the speed of the shaft 130 begins to drop below that of the wheel P3, a pawl 166 engages a tooth 167, and the reaction between the helical teeth of the wheels P3 and S3, assisted by the reaction between the engaged pawl 166 and helical tooth 167, causes the wheel P3 to slide to the front, the jaw-clutch teeth 164 and 167 meshing cleanly together under the control of the pawl 166. Sliding of the wheel P3 continues until the pawls 165 come into the path of and ratchet over the teeth 167. As soon as the wheel P3 has slid so far to the front that the teeth 174 on the abutment ring 172 come out of mesh with the fixed teeth 175, the gear-selecting mechanism becomes free to move, and the driver latches the lever 209 in position 3 and returns the engine control lever towards position F, so that the servo-motor 224 is de-energized, the friction clutch disengages and the engine accelerates. When the shaft 130 tends to rotate faster than the wheel P3, a pawl 165 engages with a tooth 167 and causes the wheel P3 to slide to the rear, the jaw-clutch teeth 164 meshing cleanly with the teeth 167 under control of the pawl 165. As these teeth become fully engaged together, the ends of the teeth 174 on the abutment ring 172 abut the ends of the fixed teeth 175 so that the wheel P3 is prevented from sliding farther to the rear. Power is now transmitted from the shaft 130, through the parts 169 and 168, the jaw clutch 167, 164, the wheels P3 and S3, and thence as before. When third-speed driving conditions are established, the wheel P2 slides, under the influence of the helical tooth reactions due to frictional drag, to its foremost position, so that its pawls 153 are in front of the clutch teeth 145 and therefore do not click idly.

Fourth speed is intended for use only when the locomotive is required to run fast under a light load, and it is engaged by shifting the gear selecting lever 209 to position 4. Such movement displaces the valve piston 229 into a position such that the pipe 227 is isolated and compressed air is delivered directly from the pipe 228 to the pipe 225. The servo motor 224 is consequently kept energized, irrespective of the position of the engine control lever 235, and power is transmitted from the shaft 130, through the clutch parts 180 and 178, the clutch body 176, the wheels P4 and S4 and thence as before. Under these conditions the wheel P3 will be rotated faster than the shaft 130, and the reaction of its helical teeth meshing with those of the wheel S3, assisted by the reaction of the helical jaw-clutch teeth 164 and 167 will cause the wheel P3 to slide to its foremost position, in which the pawls 165 ratchet idly over the teeth 167.

The change from fourth to third speed is effected by shifting the gear-selecting lever 209 to position 3 while, if desired, maintaining the power output of the engine. Since the pawls 165 are in the path of the teeth 167, third speed will be established by sliding of the wheel P3 to the rear, so as to mesh the teeth 164 and 167 together, under the influence of the reaction of the helical teeth as the speed of the shaft 130 tends to exceed that of the wheel P3.

In changing from third to second speed, the gear-selecting lever 209 is unlatched and urged towards position 2; the engine control lever 235 is momentarily returned to the idling position in order to reduce the driving torque and thus relieve the abutment ring 172 of axial thrust. As soon as this thrust is reduced enough, the abutment ring 172 can rotate so as to bring its teeth 174 into register with the gaps between the fixed teeth 175 as the driver shifts the lever 209 into position 2. When the engine accelerates again, the reaction between the helical teeth of the wheels P3 and S3, assisted by the reaction between the helical jaw-clutch 164 and 167, slides the wheel P3 to the rear. The flange 200 on the ring 172 shifts the ganging bar 196 to the rear through the agency of the fork 199, so that the fork 197 carries the wheel P2 to the rear until the pawls 153 come into the path of and ratchet over the slower running teeth 145. When the speed of the shaft 130 tends to exceed that of the wheel P2, a pawl 153 engages with a helical tooth 145 and the reaction thus generated between the helical teeth of the wheels P2 and S2, assisted by the reaction between the engaged pawl 153 and tooth 145, causes the wheel P2 to slide to the rear, establishing second speed in the manner hereinbefore described.

The change from second to first speed is initiated by unlatching the gear-selecting lever 209 and urging it towards position 1. The engine control lever 235 is momentarily returned to the idling position, so as to reduce the driving torque and relieve the abutment ring 156 of axial thrust. As soon as this thrust is reduced enough, the ring 156 can rotate so as to bring its teeth 158 into register with the gaps between the fixed teeth 159 as the driver shifts the lever 209 to position 1. When the engine accelerates again, the reaction between the helical teeth of the wheels P2 and S2, assisted by the reaction between the helical jaw-clutch teeth 145 and 151, slides the wheel P2 to the rear. Such sliding of the wheel P2 causes the ganging bar 196 also to move to the rear so that the arm 201 slides the wheel S1 to the rear until the pawls 148 come into the path of and ratchet over the faster running teeth 161. When the speed of the wheel S1 tends to exceed that of the shaft 134 and wheel S2, a pawl 148 engages with a tooth 161, and the reaction thus generated between the helical teeth of the wheels P1 and S1, assisted by the reaction between the engaged pawl 148 and tooth 161, causes the wheel S1 to slide to the rear, establishing first speed through engagement of the jaw-clutch teeth 147 and 161.

It will thus be apparent that this gear, as is convenient on an oil-engine-driven locomotive, can free-wheel on all speeds except the highest.

Figure 21:
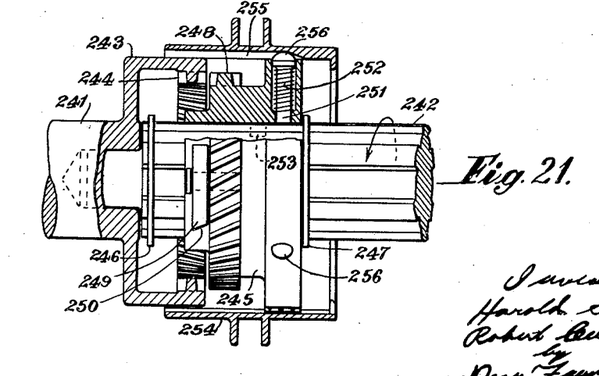
Fig. 21 is a diagrammatic sectional side elevation of an alternative form of improved synchronizing self-shifting coupling.

The synchronizing coupling shown in Fig. 21 permits the shaft 241 to rotate in the direction indicated by the arrow relatively to the shaft 242, while the latter shaft can never rotate in the said direction relatively to the shaft 241. A drum 243 rigid with the shaft 241 has internal left-handed helical jaw-clutch teeth 244. An internally splined ring 245 is slidable on splines on the shaft 242 between stops 246 and 247 and is provided with external helical jaw-clutch teeth 248 adapted to mesh with the teeth 244 under the control of one or more pawls, such as 249. The noses 250 of those pawls are bevelled to the helix angle of the jaw-clutch teeth and so positioned as to engage a tooth 244, when the parts are in the configuration shown and the shaft 242 tends to rotate in the direction indicated by the arrow relatively to the shaft 241, and so generate a reaction causing the ring 245 to slide to the left and cleanly engage the teeth 244 and 248 together. In order that the coupling can be locked so as to be capable of transmitting torque bi-directionally, the ring 245 may be provided with radially slidable bolts, such as 251, urged outwards by springs 252. When the teeth 244 and 248 are engaged together, the inner ends of these bolts register with holes, such as 253, in the shaft 242 and can be engaged with those holes, to lock the ring 245 to the shaft 242. The bolts are actuated by a striking sleeve 254 having tapered longitudinal grooves 255 adapted to accommodate the rounded outer ends 256 of the bolts 251 and to move these bolts radially inwards when the sleeve 254 is slid to the left.

We claim:
1. In a toothed wheel power transmission gearing, a positive synchronizing coupling mechanism serving as a clutch for establishing a drive through said gearing and including a first member, a second member rotatable relatively to said first member, an intermediate member in driving connection with said second member and capable of sliding relatively to said first and second members into and out of meshing engagement with said first member, and a subsidiary ratchet drive between said first and intermediate members operative while these members are disengaged to synchronize them for meshing cleanly together when said first and second members are urged to rotate relatively to each other in one sense, wherein helical teeth are disposed on the exterior of said intermediate member to co-operate with helical teeth on one of the others of said members and thereby to effect sliding of said intermediate member under the influence of torque transmitted through the mechanism.

2. In a toothed wheel power transmission gearing, a positive synchronizing coupling mechanism serving as a clutch for establishing a drive through said gearing and including a first member having a set of clutch teeth, a second member in the form of a helical toothed gear wheel disposed with its axis parallel to that of said first member, an intermediate member which is co-axial with said first member and which includes a set of clutch teeth and a helical toothed gear wheel meshing with said first-mentioned gear wheel, said intermediate member being slidable relatively to said first and second members, and a pawl mounted on one of said first and intermediate members and adapted to co-operate with the said set of clutch teeth on the other of said first and intermediate members when said sets of clutch teeth are disengaged, said pawl being operative to transmit torque in such a sense between said first member and said intermediate member that said helical gear wheels co-operate to cause said intermediate member to slide in the axial direction such that said sets of clutch teeth interengage cleanly under the registering action of said pawl.

3. In a toothed wheel power transmission gearing, a positive synchronizing coupling mechanism serving as a clutch for establishing a drive through said gearing and including a first member having a set of helically disposed clutch teeth, a second member co-axial with and rotatable relatively to said first member, an intermediate member co-axial with and slidable relatively to said first and second members and drivably connected to said second member, said intermediate member including a set of helically disposed clutch teeth adapted to co-operate with said clutch teeth on said first member, and a pawl on one of said first and intermediate members so positioned that, when said sets of clutch teeth are disengaged from each other and said mechanism is under torque load in one sense, said pawl co-operates with one of said helical clutch teeth on the other of said first and intermediate members and thereby causes a reaction urging said intermediate member axially in such a direction as to engage said sets of clutch teeth cleanly together.

4. In a toothed wheel power transmission gearing, a positive synchronizing coupling mechanism serving as a clutch for establishing a drive through said gearing and including a first member having a set of clutch teeth, a second member in the form of a helical toothed gear wheel disposed with its axis parallel to that of said first member, an intermediate member which is co-axial with said first member and which includes a set of clutch teeth and a helical toothed gear wheel meshing with said first-mentioned gear wheel, said intermediate member being slidable relatively to said first and second members, and a pawl mounted on one of said first and intermediate members and adapted to co-operate with the said set of clutch teeth on the other of said first and intermediate members when said sets of clutch teeth are disengaged, said pawl being operative to transmit torque in such a sense between said first member and said intermediate member that said helical gear wheels co-operate to cause said intermediate member to slide in the axial direction such that said sets of clutch teeth interengage cleanly under the registering action of said pawl, said two sets of clutch teeth being helically disposed in such a sense that, when the mechanism is under torque load acting in one sense, the torque reaction due to said pawl and one of said helical clutch teeth with which it co-operates in one condition, and the torque reaction due to the inter-engaged helical clutch teeth in another condition, both urge the intermediate member in the same axial direction as does the torque reaction due to the co-operating helical gear wheels.

5. In a toothed wheel power transmission gearing, a positive synchronizing coupling mechanism serving as a clutch for establishing a drive through said gearing and including a first member, a second member rotatable relatively to said first member, an intermediate member in driving connection with said second member and capable of sliding relatively to said first and second members into and out of meshing engagement with said first member, and a subsidiary ratchet drive between said first and intermediate members operative while these members are disengaged to synchronize them for meshing cleanly together when said first and second members are urged to rotate relatively to each other in one sense, helical teeth disposed on the exterior of said intermediate member to co-operate with helical teeth on one of the others of said members and thereby to effect sliding of said intermediate member under the influence of torque transmitted through the mechanism, and means operable for preventing sliding movement of said intermediate member such as to cause disengagement from each other, in at least one relative direction, of said sets of clutch teeth, said means including a thrust bearing associated with said intermediate member and an abutment member displaceable by control means and adapted to co-operate with said thrust bearing.

6. In a toothed wheel power transmission gearing, a mechanism as claimed in claim 5, wherein said abutment member is provided with a wedging surface so disposed as to initiate engaging movement of said intermediate member.

7. In a toothed wheel power transmission gearing, a positive synchronizing coupling mechanism serving as a clutch for establishing a drive through said gearing and including a first member having a set of clutch teeth, a second member in the form of a helical toothed gear wheel disposed with its axis parallel to that of said first member, an intermediate member which is co-axial with said first member and which includes a set of clutch teeth and a helical toothed gear wheel meshing with said first-mentioned gear wheel, said intermediate member being slidable relatively to said first and second members, a pawl mounted on one of said first and intermediate members and adapted to co-operate with the said set of clutch teeth on the other of said first and intermediate members when said sets of clutch teeth are disengaged, said pawl being operative to transmit torque in such a sense between said first member and said intermediate member that said helical gear wheels co-operate to cause said intermediate member to slide in the axial direction such that said sets of clutch teeth interengage cleanly under the registering action of said pawl, and means operable for preventing sliding movement of said intermediate member such as to cause disengagement from each other, in at least one relative direction, of said sets of clutch teeth, said means including a thrust bearing associated with said intermediate member and an abutment member displaceable by control means and adapted to co-operate with said thrust bearing.

8. In a toothed wheel power transmission gearing, a positive synchronizing coupling mechanism serving as a clutch for establishing a drive through said gearing and including a first member having a set of clutch teeth, a second member in the form of a helical toothed gear wheel disposed with its axis parallel to that of said first member, an intermediate member which is co-axial with said first member and which includes a set of clutch teeth and a helical toothed gear wheel meshing with said first-mentioned gear wheel, said intermediate member being slidable relatively to said first and second members, a pawl mounted on one of said first and intermediate members and adapted to co-operate with the said set of clutch teeth on the other of said first and intermediate members when said sets of clutch teeth are disengaged, said pawl being operative to transmit torque in such a sense between said first member and said intermediate member that said helical gear wheels co-operate to cause said intermediate member to slide in the axial direction such that said sets of clutch teeth interengage cleanly under the registering action of said pawl, a thrust bearing associated with said intermediate member, and an abutment member co-operating with said thrust bearing and movable at least in part radially with respect to the axis of said first and intermediate members, said abutment member being capable of effectively engaging only the part of said thrust bearing that is nearest to the axis of said second member, and a control member operatively connected with said abutment member.

9. In a toothed wheel power transmission gearing, a mechanism as claimed in claim 8, wherein said thrust bearing includes a non-rotatable member co-operating with said abutment member and carrying a Michell thrust pad co-operating with said intermediate member.

10. In a toothed wheel power transmission gearing, a mechanism as claimed in claim 7, wherein said abutment member is provided with a wedging surface capable, when said sets of clutch teeth are disengaged, of sliding said intermediate member from a position such that said pawl is inoperative to a position such that it is operative.

11. In a toothed wheel power transmission gearing, a mechanism as claimed in claim 5, and including a first abutment member associated with said thrust bearing, and a second abutment member incapable of axial displacement, said abutment members having interengageable teeth, and said control means being operable for causing relative angular displacement of said abutment members to bring their teeth into and out of meshing register.

12. In a toothed wheel power transmission gearing, a mechanism as claimed in claim 5, wherein said abutment member is capable of angular displacement under the influence of said control means about the axis of said first and intermediate members and is provided with teeth co-operating with teeth on a fixed part, the arrangement being such that, when said abutment member is in one angular position, said teeth can intermesh and, when said abutment member is in another angular position, said teeth are adapted to abut together out of meshing register.

13. In a toothed wheel power transmission gearing, a positive synchronizing coupling mechanism serving as a clutch for establishing a drive through said gearing and including a first member having a set of clutch teeth, a second member in the form of a helical toothed gear wheel disposed with its axis parallel to that of said first member, an intermediate member which is co-axial with said first member and which includes a set of clutch teeth and a helical toothed gear wheel meshing with said first-mentioned gear wheel, said intermediate member being slidable relatively to said first and second members, a pawl mounted on one of said first and intermediate members and adapted to co-operate with the said set of clutch teeth on the other of said first and intermediate members when said sets of clutch teeth are disengaged, said pawl being operative to transmit torque in such a sense between said first member and said intermediate member that said helical gear wheels co-operate to cause said intermediate member to slide in the axial direction such that said sets of clutch teeth interengage cleanly under the registering action of said pawl, a thrust bearing associated with said intermediate member, a toothed abutment member co-operating with said thrust bearing, a second abutment member incapable of axial displacement and having teeth capable of intermeshing with the teeth of said first abutment member, and control means for causing relative angular displacement of said abutment members between a position such that their teeth can intermesh and a position such that their teeth are adapted to abut together out of meshing register and thereby prevent disengagement, in at least one relative direction, of said sets of jaw-clutch teeth.

14. In a toothed wheel power transmission gearing, a mechanism as claimed in claim 7, wherein said abutment member is capable of angular displacement under the influence of said control means about the axis of said first and intermediate members and is provided with teeth co-operating with teeth on a fixed part, the arrangement being such that, when said abutment member is in one angular position, said teeth can intermesh and, when said abutment member is in another angular position, said teeth are adapted to abut together out of meshing register.

15. In multi-ratio change-speed gearing, two positive synchronizing coupling mechanisms serving as gear-selecting clutches and each including a first member, a second member rotatable relatively to said first member, an intermediate member in driving connection with said second member and capable of sliding relatively to said first and second members into and out of meshing engagement with said first member, a subsidiary ratchet drive between said first and intermediate members operative while these members are disengaged to synchronize them for meshing cleanly together when said first and second members are urged to rotate relatively to each other in one sense, and helical torque-transmitting surfaces on said intermediate member to co-operate with helical torque-transmitting surfaces on one of the others of said members and thereby to effect sliding of said intermediate member under the influence of torque transmitted through the mechanism, the intermediate members of said two mechanisms being connected together by a ganging connection so arranged that sliding of one of said intermediate members in at least one direction imparts a sliding movement to the other of said intermediate members.

16. In multi-ratio change-speed gearing, two positive synchronizing coupling mechanisms serving as gear-selecting clutches and each including a first member having a set of clutch teeth, a second member rotatable relatively to said first member, an intermediate member drivably connected to said second member by means constraining said intermediate member to slide relatively to said first and second members on reversal of torque through said means, said intermediate member having a set of clutch teeth engageable with said clutch teeth of said first member and being slidable in both axial directions from its position in which said sets of clutch teeth are intermeshed, a pawl on one of said two members which have the clutch teeth, said pawl being engageable with teeth on the other of said two members to effect meshing of said sets of clutch teeth together in one direction, an additional pawl on one of said two members engageable with teeth on the other of said two members to effect meshing of said sets of clutch teeth together in the other direction, and control means operable to prevent sliding movement of said intermediate member in at least one axial direction from its said position, the intermediate members of these two positive synchronizing coupling mechanisms being connected together by a ganging connection which provides lost motion such that, when the two sets of clutch teeth of one of said mechanisms are engaged together, the two sets of clutch teeth of the other of said mechanisms can be disengaged and the pawls of said other of the mechanisms can be inoperative, and that disengagement of the sets of clutch teeth of said one of the mechanisms slides the intermediate member of said other of the mechanisms to a position such that one of the pawls of said other of the mechanisms becomes operative.

17. In multi-ratio change-speed gearing, two positive synchronizing coupling mechanisms serving as gear-selecting clutches and each including a first member having a set of clutch teeth, a second member rotatable relatively to said first member, an intermediate member drivably connected to said second member by means constraining said intermediate member to slide relatively to said first and second members on reversal of torque through said means, said intermediate member having a set of clutch teeth engageable with said clutch teeth of said first member, and a pawl on one of said two members which have the clutch teeth, said pawl being engageable with teeth on the other of said two members to effect meshing of said sets of clutch teeth together in one direction, at least one of said positive synchronizing coupling mechanisms also having an additional pawl on one of said two members which have the clutch teeth, said additional pawl being engageable with teeth on the other of said two members to effect meshing of said sets of clutch teeth together in the other direction and control means operable to prevent sliding movement of the intermediate member of said one of the coupling mechanisms, the intermediate members of these two positive synchronizing coupling mechanisms being connected together by a ganging connection which provides lost motion such that, when the two sets of clutch teeth of the other of said mechanisms are engaged together, the two sets of clutch teeth of said one of the mechanisms can be disengaged and the pawls of said one of the mechanisms can be inoperative, and that disengagement of the sets of clutch teeth of said other of the mechanisms slides the intermediate member of said one of the mechanisms to a position such that one of the pawls of said one of the mechanisms becomes operative.

18. Mechanism as claimed in claim 16, wherein each of said positive synchronizing coupling mechanisms includes a thrust bearing associated with said intermediate member, a toothed abutment member co-operating with said thrust bearing, a second abutment member incapable of axial displacement and having teeth capable of intermeshing with the teeth of said first abutment member, and control means for causing relative angular displacement of said abutment members between a position such that their teeth can intermesh and a position such that their teeth are adapted to abut together out of meshing register and thereby prevent disengagement, in at least one relative direction, of said sets of jaw-clutch teeth, the control means of both of said coupling mechanisms being operatively connected to a common control member, and the abutment members of at least one of said coupling mechanisms being capable, when their teeth are intermeshed, of relative angular displacement sufficient to permit said control member to relatively displace the abutment members of the other of said coupling mechanisms between their intermeshing and their abutting relationships.

19. In a toothed wheel power transmission gearing, a positive synchronizing coupling mechanism serving as a clutch for establishing a drive through said gearing and including a first member having helical jaw-clutch teeth, a second member rotatable relatively to said first member, an intermediate member in driving connection with said second member, said intermediate member having helical jaw-clutch teeth engageable, upon sliding of said intermediate member relatively to said first member, with the jaw-clutch teeth of said first member, and a pawl mounted on one of said toothed members and having a nose bevelled to the helix angle of said jaw-clutch teeth, said pawl being so positioned as to be capable of engaging a tooth of the other of said toothed members and thereby generating a reaction urging said intermediate member to mesh cleanly with said first member.

20. In a toothed wheel power transmission gearing, a positive synchronizing coupling mechanism serving as a clutch for establishing a drive through said gearing and including a first member having a set of helically disposed clutch teeth, a second member in the form of a helically toothed gear wheel, an intermediate member which is co-axial with said first member and which includes a set of helically disposed clutch teeth and a helically toothed gear wheel meshing with said first-mentioned gear wheel, said intermediate member being slidable relatively to said first and second members, and a pawl mounted on one of said first and intermediate members for co-operation with the jaw-clutch teeth of the other of said first and intermediate members when said sets of clutch teeth are disengaged, said pawl being so positioned and the helix directions of said jaw-clutch teeth and of said gear wheels being such that, on engagement of said pawl with one tooth of the set of helical jaw-clutch teeth with which it co-operates, said intermediate member is urged into meshing engagement with said first member by the reaction of meshed helical teeth of said gear wheels assisted by the reaction of the pawl engaged with a helical jaw-clutch tooth.

HAROLD SINCLAIR.
ROBERT CECIL CLERK.